US008471781B2

(12) United States Patent
Massand

(10) Patent No.: US 8,471,781 B2
(45) Date of Patent: Jun. 25, 2013

(54) SYSTEM AND METHOD FOR THE AUTO-DETECTION AND PRESENTATION OF PRE-SET CONFIGURATIONS FOR MULTIPLE MONITOR LAYOUT DISPLAY

(75) Inventor: Deepak Massand, McLeansville, NC (US)

(73) Assignee: Litera Technologies, LLC, McLeansville, NC (US)

( * ) Notice: Subject to any disclaimer, the term of this patent is extended or adjusted under 35 U.S.C. 154(b) by 593 days.

(21) Appl. No.: 12/406,090

(22) Filed: Mar. 17, 2009

(65) Prior Publication Data

US 2010/0238089 A1 Sep. 23, 2010

(51) Int. Cl.
*G09G 5/00* (2006.01)

(52) U.S. Cl.
USPC ............. 345/1.1; 345/1.2; 345/3.1; 345/2.1; 345/156; 345/204

(58) Field of Classification Search
USPC .............. 345/1.1, 1.3, 156, 634, 670, 629, 345/660, 3.1, 60, 100, 204, 441, 581, 601, 345/66, 730; 715/788, 769, 736, 744, 781, 715/234; 361/679.04, 600; 348/564, 567, 348/569; 713/200, 323; 455/3.01; 382/294
See application file for complete search history.

(56) References Cited

U.S. PATENT DOCUMENTS

| | | | | |
|---|---|---|---|---|
| 4,785,296 A * | 11/1988 | Tabata et al. | | 345/634 |
| 4,809,163 A * | 2/1989 | Hirosawa et al. | | 713/323 |
| 5,289,390 A * | 2/1994 | Unverrich | | 345/1.1 |
| 5,367,615 A * | 11/1994 | Economy et al. | | 345/441 |
| 5,748,189 A * | 5/1998 | Trueblood | | 715/755 |
| 5,764,518 A * | 6/1998 | Collins | | 700/95 |
| 5,805,118 A * | 9/1998 | Mishra et al. | | 345/1.1 |
| 6,046,709 A * | 4/2000 | Shelton et al. | | 345/1.1 |
| 6,411,302 B1 * | 6/2002 | Chiraz | | 345/545 |
| 6,570,546 B1 * | 5/2003 | Welker et al. | | 345/1.1 |
| 6,801,211 B2 * | 10/2004 | Forsline et al. | | 345/581 |
| 6,847,335 B1 * | 1/2005 | Chang et al. | | 345/3.1 |
| 7,030,892 B1 | 4/2006 | Gyde et al. | | |
| 7,123,248 B1 * | 10/2006 | Lafleur | | 345/204 |
| 7,911,408 B2 * | 3/2011 | Cho et al. | | 345/2.1 |
| 7,948,448 B2 * | 5/2011 | Hutchinson et al. | | 345/1.1 |
| 8,125,932 B2 * | 2/2012 | Yang | | 370/260 |
| 8,191,008 B2 * | 5/2012 | Ramnani | | 715/788 |
| 8,280,483 B2 * | 10/2012 | Zhu et al. | | 600/407 |
| 2003/0015632 A1 * | 1/2003 | Dunn et al. | | 248/122.1 |
| 2003/0027517 A1 * | 2/2003 | Callway et al. | | 455/3.01 |
| 2003/0090506 A1 * | 5/2003 | Moore et al. | | 345/730 |
| 2003/0110926 A1 * | 6/2003 | Sitrick et al. | | 84/477 R |
| 2003/0117408 A1 * | 6/2003 | Forsline et al. | | 345/581 |
| 2003/0182418 A1 | 9/2003 | Feldman et al. | | |
| 2003/0214585 A1 * | 11/2003 | Bakewell | | 348/148 |
| 2004/0015893 A1 * | 1/2004 | Banavar et al. | | 717/138 |
| 2004/0075623 A1 * | 4/2004 | Hartman | | 345/1.3 |
| 2004/0088564 A1 * | 5/2004 | Norman | | 713/200 |
| 2004/0246253 A1 * | 12/2004 | Mizukami | | 345/441 |

(Continued)

*Primary Examiner* — Prabodh M Dharia

(74) *Attorney, Agent, or Firm* — Finnegan, Henderson, Farabow, Garrett & Dunner L.L.P.

(57) ABSTRACT

A system, method and computer program product for configuration of multiple monitor layout displays, including detecting a presence of multiple monitors installed in a computer system; configuring layouts for the multiple monitors, including, configuring at least one of size, shape and location of corresponding displays of the multiple monitors, and configuring at least one of size, shape and location of content for display on the multiple monitors; and displaying the configured layouts on the multiple monitors.

22 Claims, 13 Drawing Sheets

U.S. PATENT DOCUMENTS

| | | |
|---|---|---|
| 2005/0057435 A1 | 3/2005 | Su |
| 2005/0237699 A1* | 10/2005 | Carroll .......................... 361/600 |
| 2006/0007240 A1* | 1/2006 | Herbert et al. ................ 345/601 |
| 2006/0238967 A1* | 10/2006 | Carson et al. ................. 361/681 |
| 2006/0267857 A1* | 11/2006 | Zhang et al. ................... 345/1.1 |
| 2007/0079252 A1* | 4/2007 | Ramnani ....................... 715/781 |
| 2007/0279315 A1* | 12/2007 | Laves et al. ................... 345/1.1 |
| 2008/0008401 A1* | 1/2008 | Zhu et al. ..................... 382/294 |
| 2008/0055201 A1* | 3/2008 | Kajiwara ....................... 345/60 |
| 2008/0165202 A1* | 7/2008 | Brodersen et al. ............ 345/581 |
| 2009/0079687 A1* | 3/2009 | Herz et al. .................... 345/100 |
| 2010/0257442 A1* | 10/2010 | Kembel et al. ................ 715/234 |
| 2011/0102299 A1* | 5/2011 | Hochmuth et al. ............ 345/1.2 |

\* cited by examiner

US 8,471,781 B2

SYSTEM AND METHOD FOR THE AUTO-DETECTION AND PRESENTATION OF PRE-SET CONFIGURATIONS FOR MULTIPLE MONITOR LAYOUT DISPLAY

FIELD OF THE INVENTION

The present invention generally relates to methods and systems for the configuration of multiple monitors, and more particularly to a method and system for the auto-detection of multiple monitors and presentation of preset configurations for multiple monitor layout display.

BACKGROUND

Computer systems in their origination were developed to display content within graphical user interfaces ("GUI") on a single monitor. Users that wished to view more than a single file, GUI, dialog window or other display or presentation of content on a computer system (e.g., windows within computer applications, various GUIs of computer applications, dialog windows within computer applications, dialog windows related to operating systems, etc.) in synchronicity with another displaying of content, would be required to size such displaying of content within the single monitor display area so that all displaying of content were viewable at the same time. This single-monitor restriction, while functional for a period of time, led to inefficiency in file and task management. Users that required a synchronicity of views were required to view their multiple displays of content in smaller form, limiting their capacity to more effectively complete the requirements they sought.

As computer programs and users' needs became more complex, the ability to present content on multiple monitors provided users with additional display areas to more effectively manage their computational tasks. Conventional mechanisms have been provided to arrange multiple monitors in logical space and provide relative presentation of data on those multiple monitors. This has enabled users to view and engage with multiple programs and/or iterations of files and other content on more than one monitor. Common real-world uses, such as the viewing and management of two or more Microsoft Word documents in synchronicity, the viewing and management of files displayed in two or more separate graphic design programs (e.g., Adobe Photoshop and Adobe Illustrator) in synchronicity or the viewing and management of two or more database spreadsheets in synchronicity were enabled with the development of mechanisms to display separate content and GUIs in multiple monitors.

With the advent of multiple monitor systems, users, through cursor manipulation, were able to move objects, such as GUIs, windows, dialog screens within GUIs and other displays of content across monitors. Users could then view in synchronicity multiple displays of content without the requirement of shrinking their size (in order to display all displays of content within a single monitor). The limitations of the single monitor system (screen clutter, confusing display of content/applications and the limitation in viewing area) were alleviated with these conventional systems and methods to manage and display multiple displays of content on multiple monitors in synchronicity.

While conventional devices have been able to provide this added feature to users with multiple monitors, they are limited in their management of displays of content within and across multiple monitors. The ability to detect multiple monitors by processing systems, while an active measure, does not cross-pollinate into the detection systems within computer applications, a required measure to provide robust management of layouts across monitors.

In addition and as stated above, conventional devices, while having enabled the ability to move and manipulate displays of content across monitors, this process is capacitated only by cursor manipulation. To manipulate displays of content so that it can be displayed on an additional, a user must open an application and then "drag and drop" that displays of content in the apportioned area of the additional monitor. This action must be taken each time a user wishes to manipulate the viewing layout of their displays of content. While their previous layout can be "remembered" by the application, the next time the user works within that application (e.g., new files created by an application default to open on a second monitor, as opposed to a first), any change across monitors must be manually completed by the user through cursor manipulation.

SUMMARY

Embodiments of the invention provide a system and method with a capacity to auto-detect the presence of multiple monitors and present preset configurations for displaying of content (e.g., windows within computer applications, various GUIs of computer applications, dialog windows within computer applications, dialog windows related to operating systems, etc.) within and across multiple computer monitors connected to a single computer workstation. In an exemplary embodiment, the system and method, advantageously, provides the ability for the creation, saving and management of default multiple monitor layouts, and the like, by operating systems, computer applications, and the like.

Accordingly, an exemplary system, method and computer program product for configuration of multiple monitor layout displays, including detecting a presence of multiple monitors installed in a computer system; configuring layouts for the multiple monitors, including, configuring at least one of size, shape and location of corresponding displays of the multiple monitors, and configuring at least one of size, shape and location of content for display on the multiple monitors; and displaying the configured layouts on the multiple monitors, is presented.

Still other aspects and features of the invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

Embodiments of the invention are illustrated by way of example, and not by way of limitation, in the figures of the accompanying drawings, which are included to provide a further understanding of the invention and are incorporated in and constitute a part of this specification. In the drawings.

DETAILED DESCRIPTION

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

The invention includes recognition that conventional systems detect the presence of multiple monitors installed on a computer and provide for the ability for users to manipulate displays of content within and across monitors by cursor manipulation. However, these systems fail to provide for a relationship between the detection of multiple monitors and the integration of that information in the display capacity of computer applications. For example, users wishing to view two Microsoft Word documents, each on separate monitors, are required to physically move one of those documents across monitors to the second monitor and would need to do so each time they wished to view their documents in that layout format. The present invention would provide for a mechanism to view those documents in that preferred layout by selecting that layout from a list of pre-configured multiple monitor layouts.

Generally, the exemplary embodiments include the capacity to auto-detect the presence of multiple monitors and to present preset configurations for multiple monitor displays of content. In one aspect of the invention, a computer system detects the presence of multiple monitors for use in the creation, presentation and management of multiple monitor display layouts. The exemplary system and method of the invention then provides a mechanism by which users may utilize preset multiple monitor configurations for displays of content and to also create preset multiple monitor configurations for displays of content with respect to the display of multiple applications in synchronicity. This is enabled through a series of steps, described in detail below.

Figure 1:
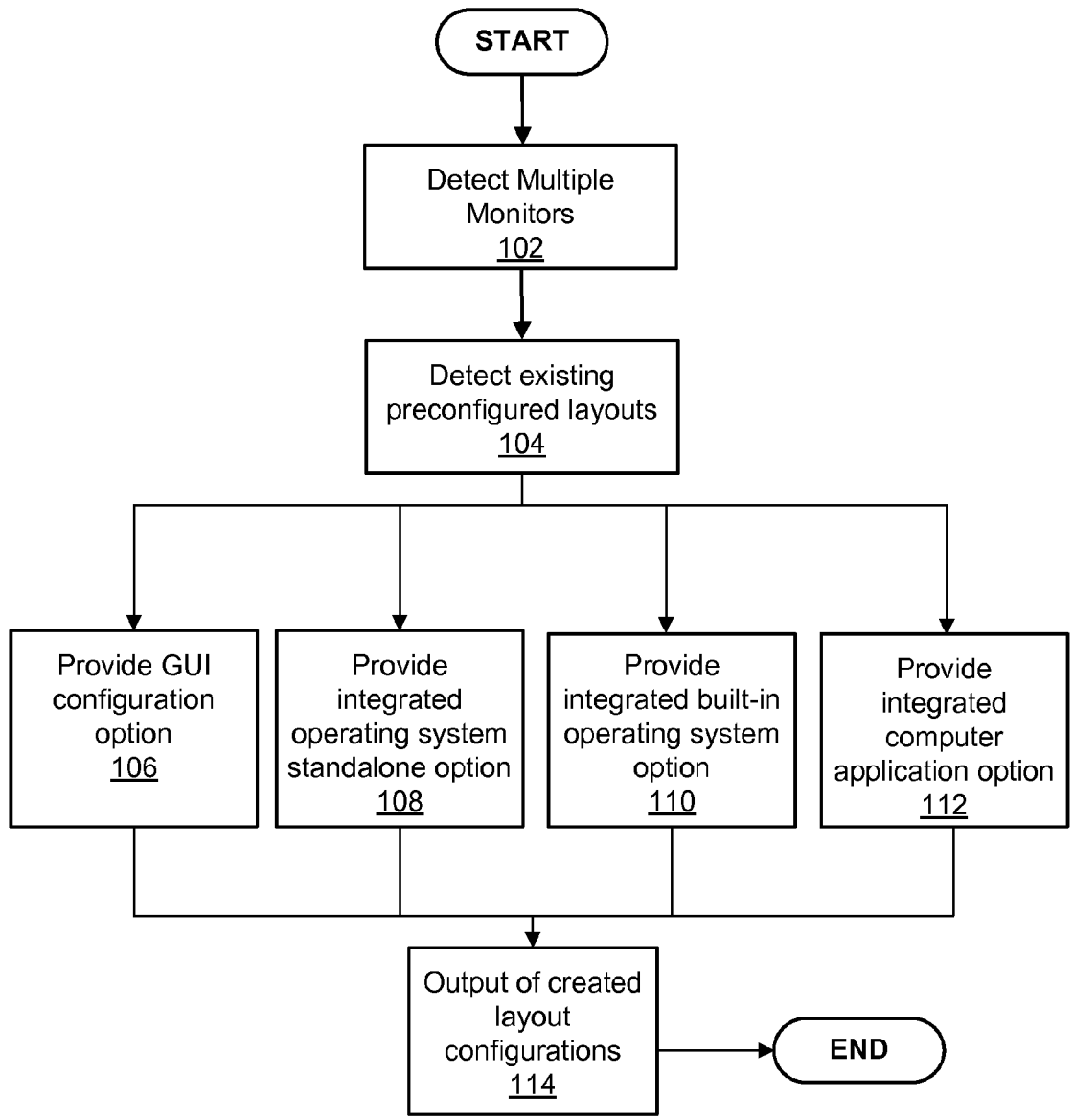
FIG. 1 is a higher-level process flowchart by which the exemplary system and method auto-detects multiple monitors and provides a range of tools to display multiple monitor layout configurations when multiple monitors are detected.

Reference is now made to the drawings, and more particularly to FIG. 1, which illustrates a process flowchart by which the exemplary system and method auto-detects multiple monitors and provides a range of tools to display multiple monitor layout configurations when multiple monitors are detected. In FIG. 1, at step 102, the system detects the presence of multiple monitors installed on a computer. The system then, at step 104, detects the presence of existing preconfigured layouts, if relevant, created through the system and method at a previous time. The system and method then provides the potential of multiple mechanisms to manage preconfigured multiple monitor layout settings. At step 106, the system and method provides a GUI in which users can create, manage and save new layouts for displays of content within and across multiple monitors. At step 108, the system and method provides users with the ability to create, manage and save new layouts for displays of content within and across multiple monitors through a standalone option integrated with an operating system. At step 110, the system and method provides users with the ability to create, manage and save new layouts for displays of content within and across multiple monitors through an option in which the control of multiple monitor layouts is integrated within an operating system. At step 112, the system and method provides users the capacity to create, save, manage and access multiple monitor layouts from within the GUI of a computer application. In addition, at this point, a manufacturer. Finally, at step 114, the system and method, through various options, allows for the output of the layout configurations, as created by the user or manufacturer of a computer application in the steps 106-112.

Figure 2:
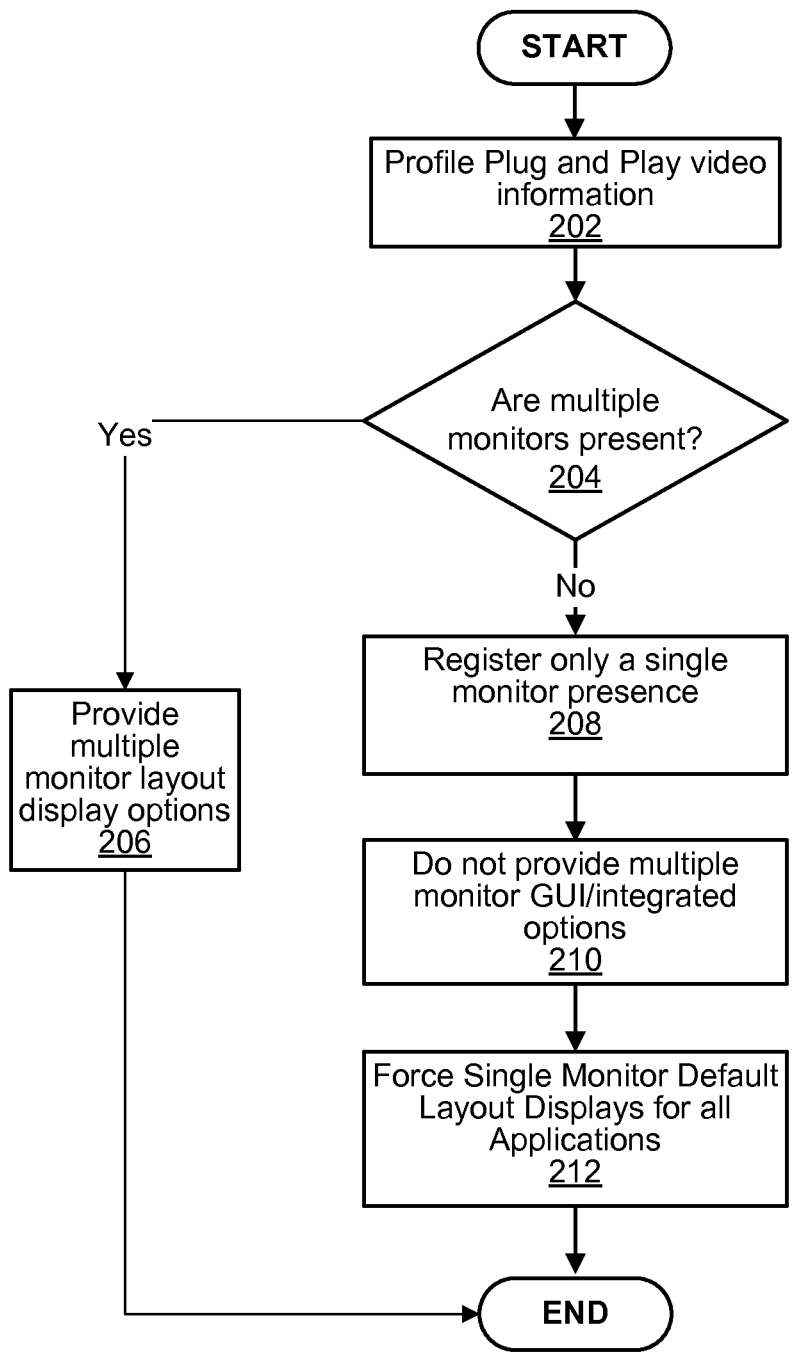
FIG. 2 is a process flowchart by which the exemplary system and method detects the presence (or lack of presence) of multiple monitors.

FIG. 2 illustrates a process flowchart by which the exemplary system and method detects the presence, or lack of presence of multiple monitors on a computer. In FIG. 2, the system and method, upon system start-up, searches the computer's records and profiles data stored in the computer's plug and play information settings at step 202. These data provide the system and method with the ability to determine at step 204 if multiple monitors are present and if so, the system and method then provides the various multiple monitor layout display options at step 206, as previously described. Otherwise, if no multiple monitors are present, the system and method at step 208 registers only a single monitor presence and does not provide multiple monitor display options at step 210. In addition, in cases where users previously had set certain displays of content to appear in the region where a secondary monitor would be, the system and method forces those displays of content to open within the region of the single monitor, thus alleviating the requirement to connect a dual monitor to manage that hidden window.

Figure 3:
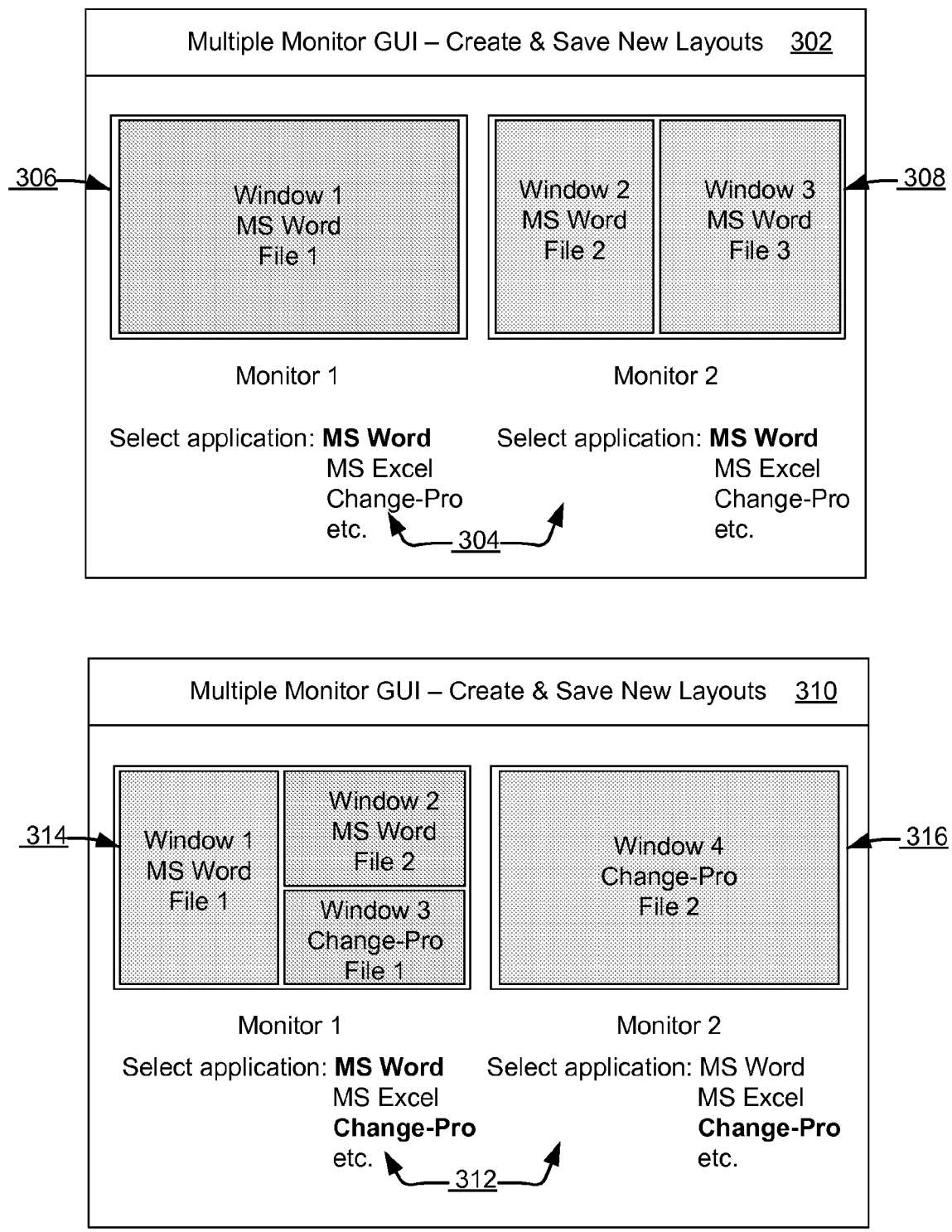
FIG. 3 is a diagram of a GUI that enables users to create and save multiple layout configurations for each computer application and across applications.

Users are given the power, through the system and method's GUI, to create and save multiple layout configurations for each computer application installed on their computer and across applications. FIG. 3 illustrates two examples of the GUI. In 302, there is illustrated the creation of a new default layout. In 304, there is illustrated the listing of computer applications on the system (in the hypothetical) in which default multiple monitor layouts can be pre-configured. Users first select the application they wish to define within the monitor space. They then are given the power to "draw" a box with their cursor in the space provided for that monitor, in which they can define the size, shape and location of that file iteration. On Monitor 1 shown at 306, one can see in this example, the first iteration of a Microsoft Word document is displayed so that it fills the entirety of that monitor. On Monitor 2 shown at 308, the second and third iterations of a Microsoft Word are displayed, so that they each take up roughly half of the available screen space on that monitor. In the second example of the GUI, at 310, one can see a similar scenario as seen in 302. However, in this example, layouts are defined for multiple applications and multiple iterations of those applications. In 312, one can see the listing of computer applications on the system (in the hypothetical) in which default multiple monitor layouts can be pre-configured. Users first select the application they wish to define within the monitor space. They then are given the power to "draw" a box with their cursor in the space provided for that monitor, in which they can define the size, shape and location of that file iteration. On Monitor 1 shown at 314, one can see in this example, the first iteration of a Microsoft Word document is displayed on the left half of the screen and on the right half, the second iteration of a Microsoft Word document and the first iteration of a Change-Pro document are displayed. On Monitor 2 shown at 316, the second iteration of a Change-Pro document is displayed so that it takes up the entirety of the screen space of that monitor.

Figure 4:
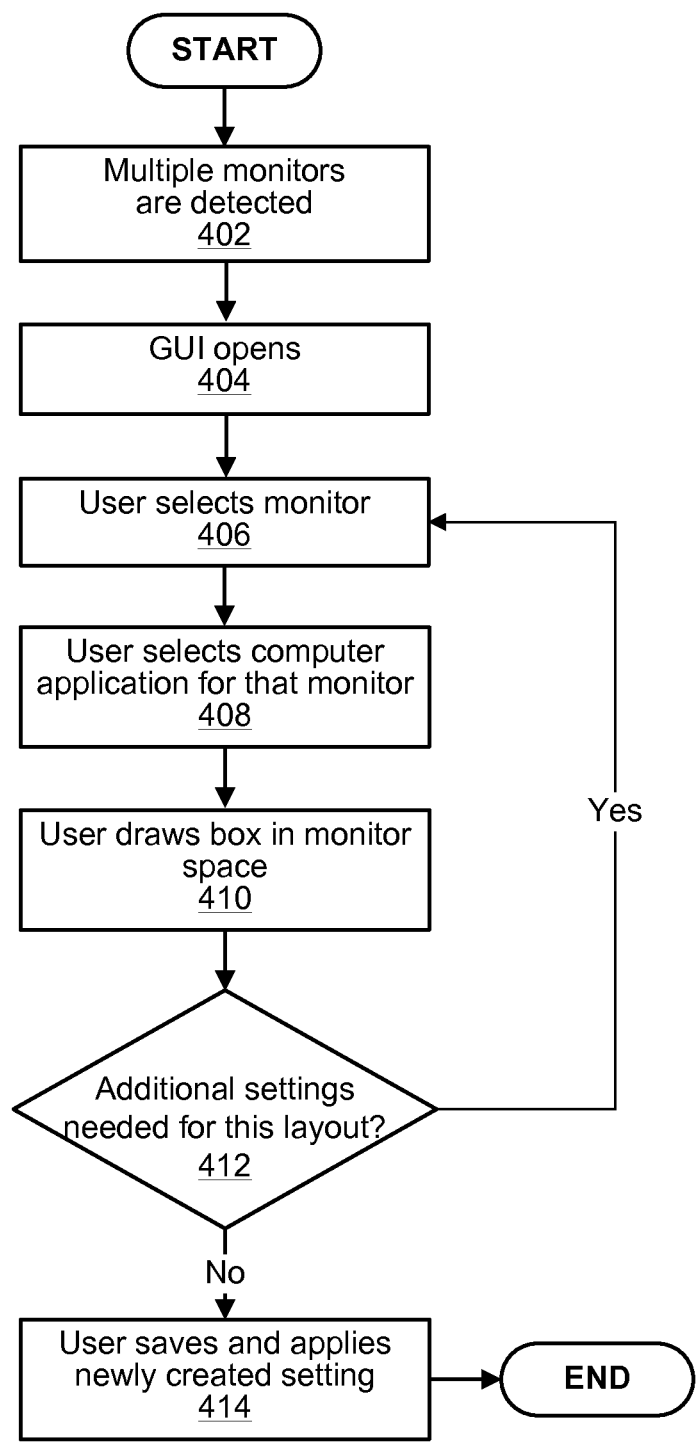
FIG. 4 is a process flowchart of an exemplary process by which users can create and save multiple layout configurations for each computer application and across applications.

FIG. 4 illustrates a process flowchart of an exemplary process by which users can create and save multiple layout configurations for each computer application and across applications. First, at step 402, the exemplary system and method detects the presence of multiple monitors. The GUI then opens at step 404. From within the GUI, the user selects a monitor at step 406. The user then selects a computer application at step 408. Once a computer application is selected, the user is given the capacity to draw a box at step 410 within the space for the monitor that was selected at step 406. This box can be any size or rectangular shape and can be located anywhere within the monitor space. Once the box for that particular application and that particular monitor has been successfully created, the user is provided with the option to create additional boxes at step 412, either on that same monitor or on a different monitor and either for the next iteration of the same computer application or for the first iteration of a different computer application. This process continues until the user has sufficiently created the desired layout for this particular multiple monitor default layout setting. The user then saves this layout to the GUI at step 414 and can access and use this layout at a future point through the GUI.

Figure 5:
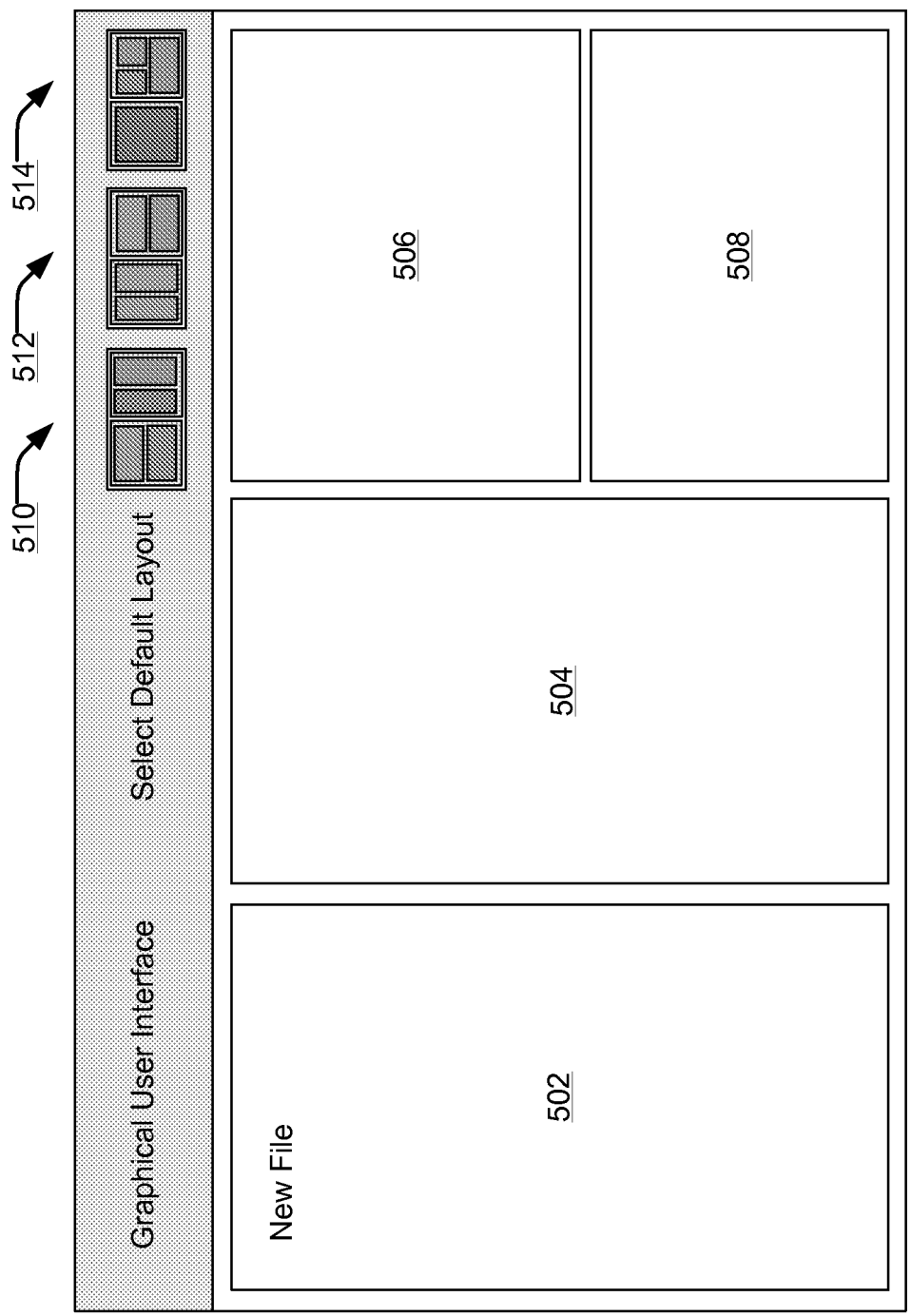
FIG. 5 is a diagram of an example of how a manufacturer of computer applications can integrate default multiple monitor layouts into their programs.

FIG. 5 provides a diagram of an example of how a manufacturer of computer applications can integrate and provide default multiple monitor layouts into their programs. In FIG. 5, at 502-508, one can see four new files created by a computer application. With multiple monitors present, the GUI of the computer application presents in at 510, 512 and 514, three "default layouts" for the display of those files within and across multiple monitors. By selecting one of those default layouts, the four open files will automatically be re-displayed as defined in the parameters of those default layouts.

Figure 6:
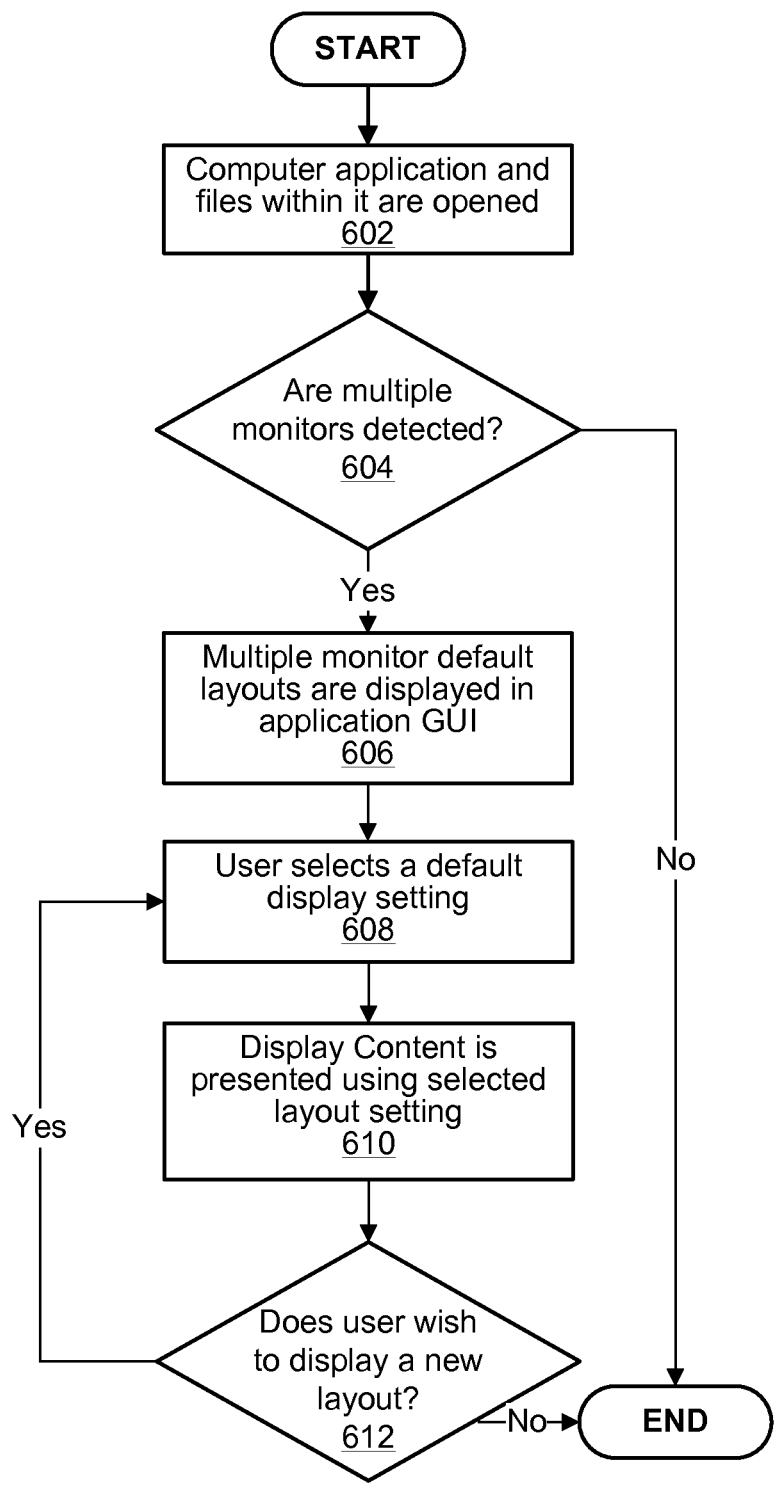
FIG. 6 is a process flowchart of an exemplary process by which users can access and control layouts when they have been integrated by manufacturers into their programs.

FIG. 6 illustrates a process flowchart of the exemplary process by which users can access and control layouts when they have been integrated by manufacturers into their programs. In FIG. 6, at step 602, the computer application and files within it are opened. If multiple monitors are detected at step 604, the default layouts defined by the manufacturer of the computer application are displayed in the computer application's GUI at step 606. The user then selects one of those default multiple monitor layout settings. Displays of content (in this case the files that are opened) are then presented at step 610 within and across multiple monitors, as defined by the default multiple monitor layout settings of the computer application. If the user wishes to view the opened files in a different default layout at step 612, control reverts back to step 606 where they can select a separate default multiple monitor display setting, which then reconfigures the open documents and displays them within and across multiple monitors, as defined by that new, default setting.

Figure 7:
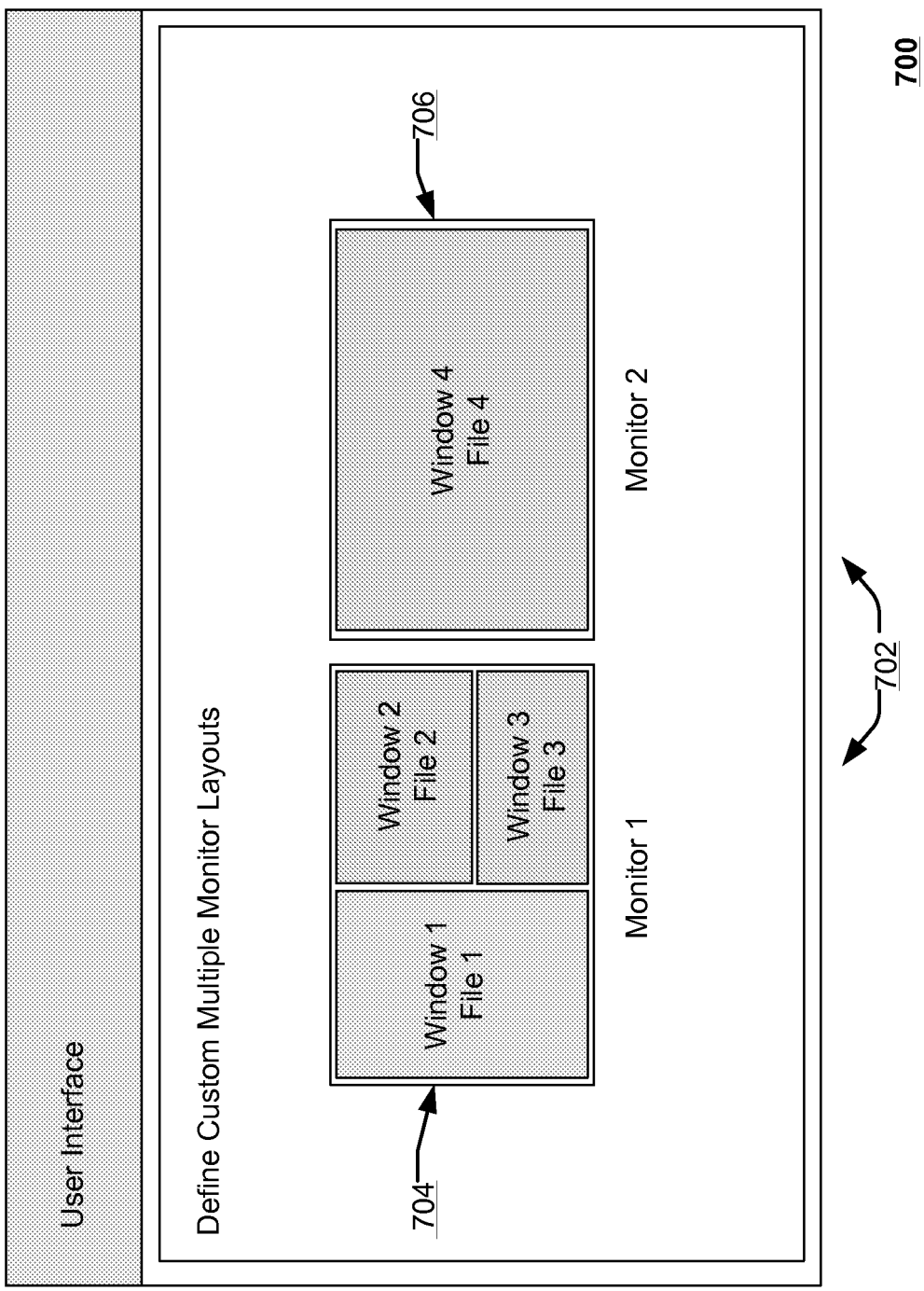
FIG. 7 is a diagram of an example of how computer application manufacturers can integrate the capacity for users to create customized preconfigured multiple monitor layouts in their programs.

The ability to allow users to create their own customized default layout settings for multiple monitors can be provided by the manufacturers of computer applications. FIG. 7 illustrates a diagram of an example of how computer application manufacturers can integrate the capacity for users to create customized preconfigured multiple monitor layouts in their programs. In FIG. 7, the GUI 702 gives the users the ability to draw boxes in display areas for each monitor (704 shows Monitor 1 in this example and 706 shows Monitor 2). Users can size and shape these boxes and place them anywhere within the region provided for that monitor space.

Figure 8:
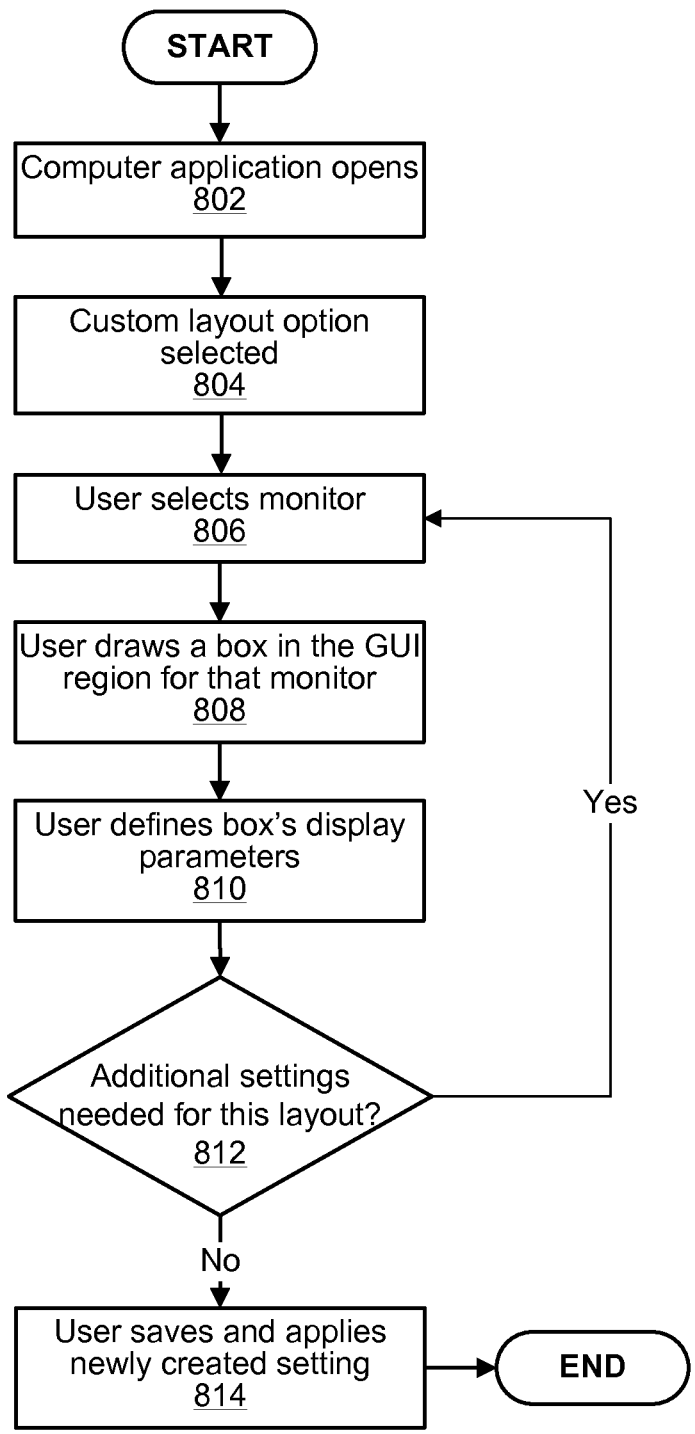
FIG. 8 is a process flowchart of an exemplary process by which users can create, save and access at future points in time customized preconfigured multiple monitor layouts in computer programs.

FIG. 8 illustrates a process flowchart of an exemplary process by which users can create, save and access at future points in time customized preconfigured multiple monitor layouts in computer programs. In FIG. 8, at step 802, the application opens. At step 804, the user selects the "Custom Multiple Monitor Display Settings" option from the application's menu selections. When the GUI displays the settings dialog screen, the user first selects a monitor. They then are able to draw a box within that monitor at step 808 and define its size, shape and location at step 810. If additional settings are needed for that customized multiple monitor display setting, the user can repeat these steps by again selecting a monitor and then drawing and defining a new box's parameters within the region of that monitor. Once the user has completed these setting definitions, they are able to save and apply the newly created multiple monitor display settings at step 814.

Figure 9:
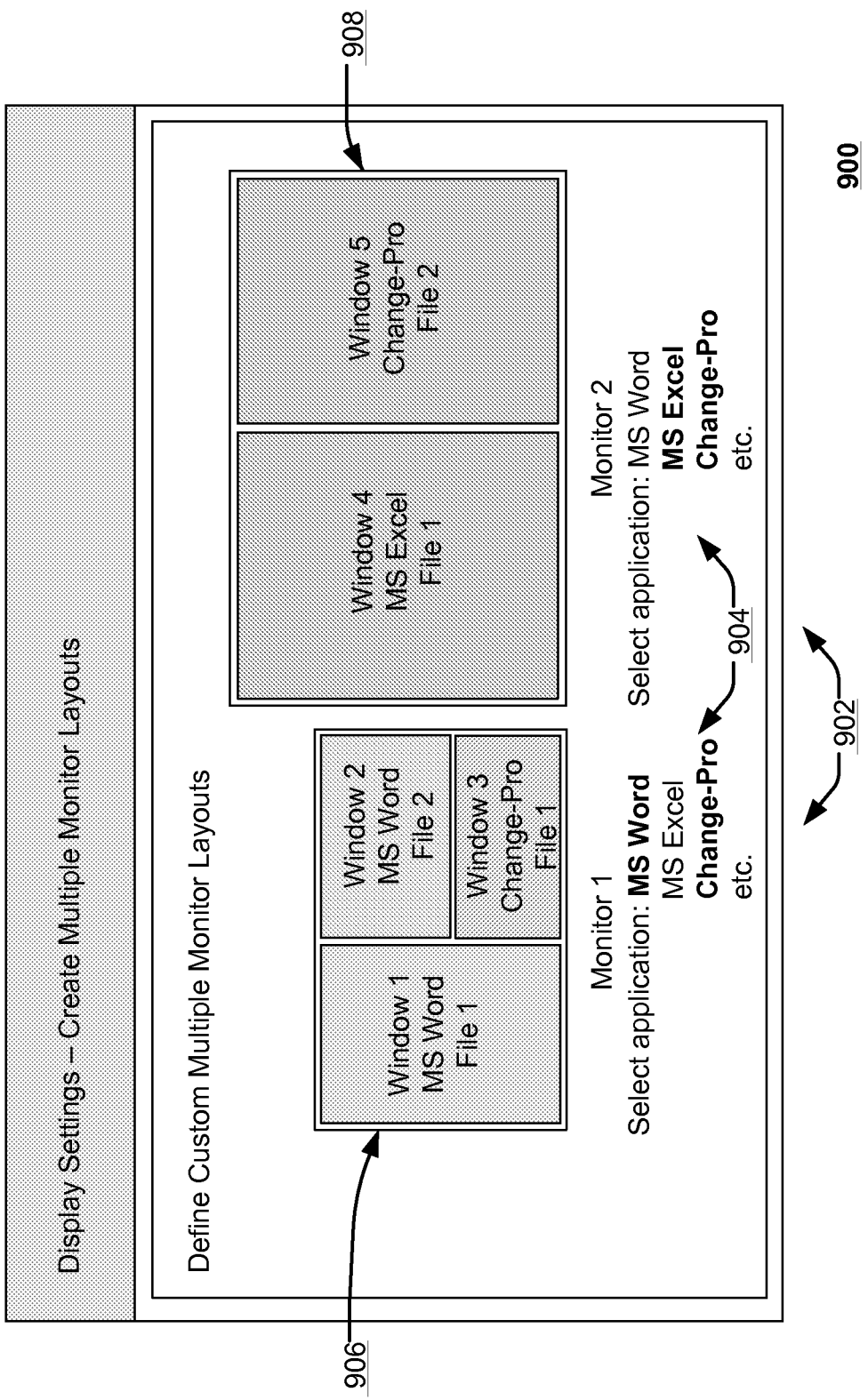
FIG. 9 is a diagram of an example of how computer operating systems can integrate the capacity for users to create customized preconfigured multiple monitor layouts in their programs as a built-in mechanism or as a standalone mechanism.

Operating systems, such as Microsoft Windows, are also able to integrate the capacity for users to create customized, preconfigured multiple monitor layouts, either as a built-in mechanism or as a standalone mechanism. FIG. 9 is used to show how an operating system can integrate this capacity. In FIG. 9, at 902, one can see the creation of a new default layout in an operating system's GUI. At 904, one can see the listing of computer applications installed on the computer (in the hypothetical) in which default multiple monitor layouts can be pre-configured. Users first select the application they wish to define within the monitor space. They then are given the power to "draw" a box with their cursor in the space provided for that monitor, in which they can define the size, shape and location of that file iteration. On Monitor 1 shown at 906, one can see in this example, the first iteration of a Microsoft Word document is displayed so that it fills half of the monitor space, while the other half is shared by the second iteration of a Microsoft Word document and the first iteration of a Change-Pro document. On Monitor 2 shown at 908, the first iteration of a Microsoft Excel document and the second iteration of a Change-Pro document share the monitor screen, so that they each take up roughly half of the available screen space on that monitor. Users can create and define the parameters of these layouts and save them for future use by the mechanisms provided by the operating system, either built-into existing mechanisms of the operating system or as standalone mechanisms that can be utilized and manipulated by users.

Figure 10:
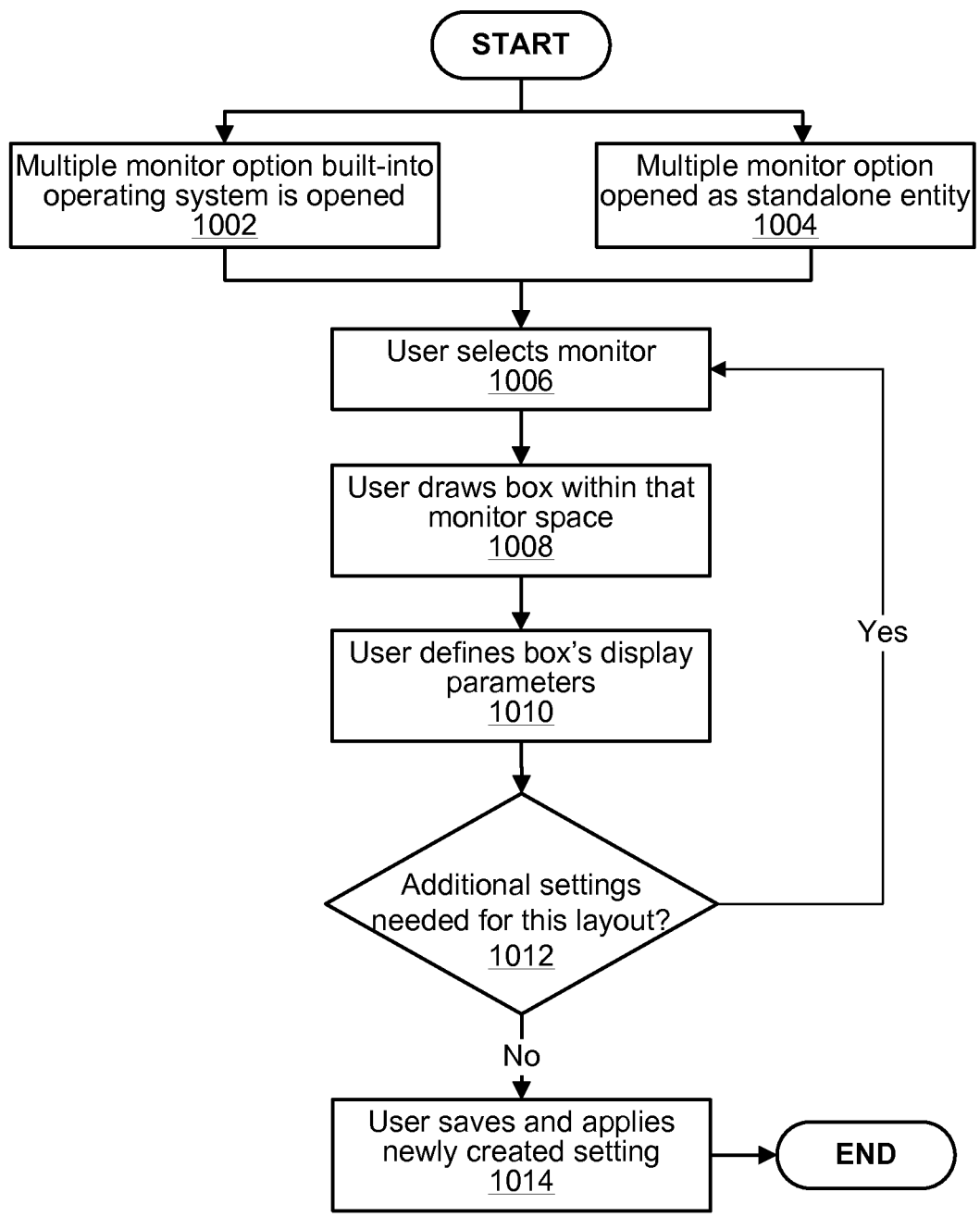
FIG. 10 is a process flowchart of an exemplary process by which users can create, save and access at future points in time customized preconfigured multiple monitor layouts in operating systems, via a built-in or standalone mechanism.

FIG. 10 illustrates a process flowchart of an exemplary process by which users can create, save and access at future points in time customized preconfigured multiple monitor layouts in operating systems, via a built-in or standalone mechanism. In FIG. 10, at steps 1002 and 1004, the multiple monitor layout settings option is opened either within a built-in operation or as a standalone mechanism. At step 1006, the user selects a monitor. They then are able to draw a box within that monitor space at step 1008 and define its size, shape and location at step 1010. If additional settings are needed for that customized multiple monitor layout setting at step 1012, the user can repeat these steps by again selecting a monitor and then drawing and defining a new box's parameters within the region of that monitor. Once the user has completed these setting definitions, they are able to save and apply the newly created multiple monitor display settings at step 1014.

Figure 11A:
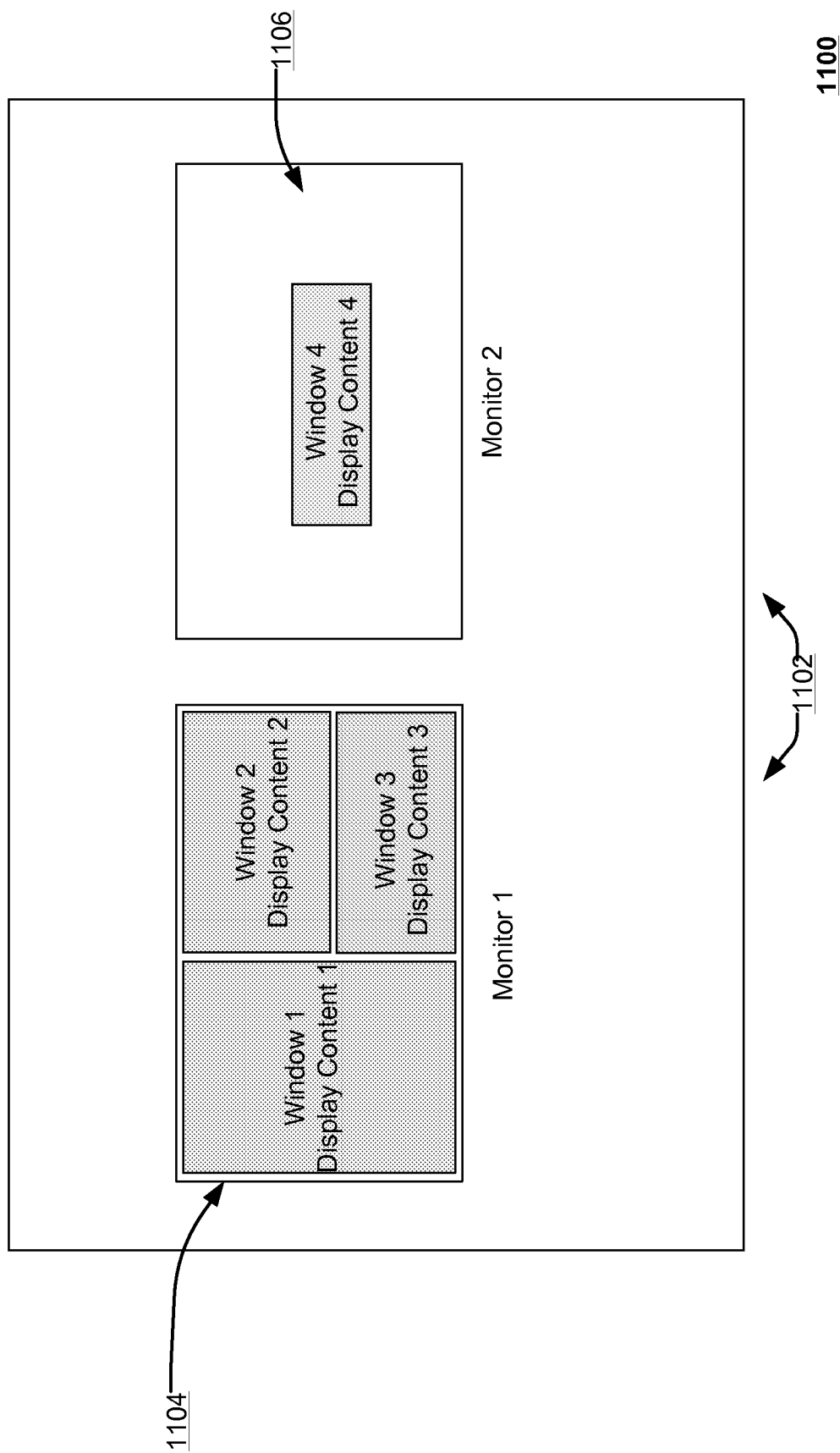
FIG. 11A is a presentation of one embodiment of how prior art present displays of content across multiple monitors.
Figure 11B:
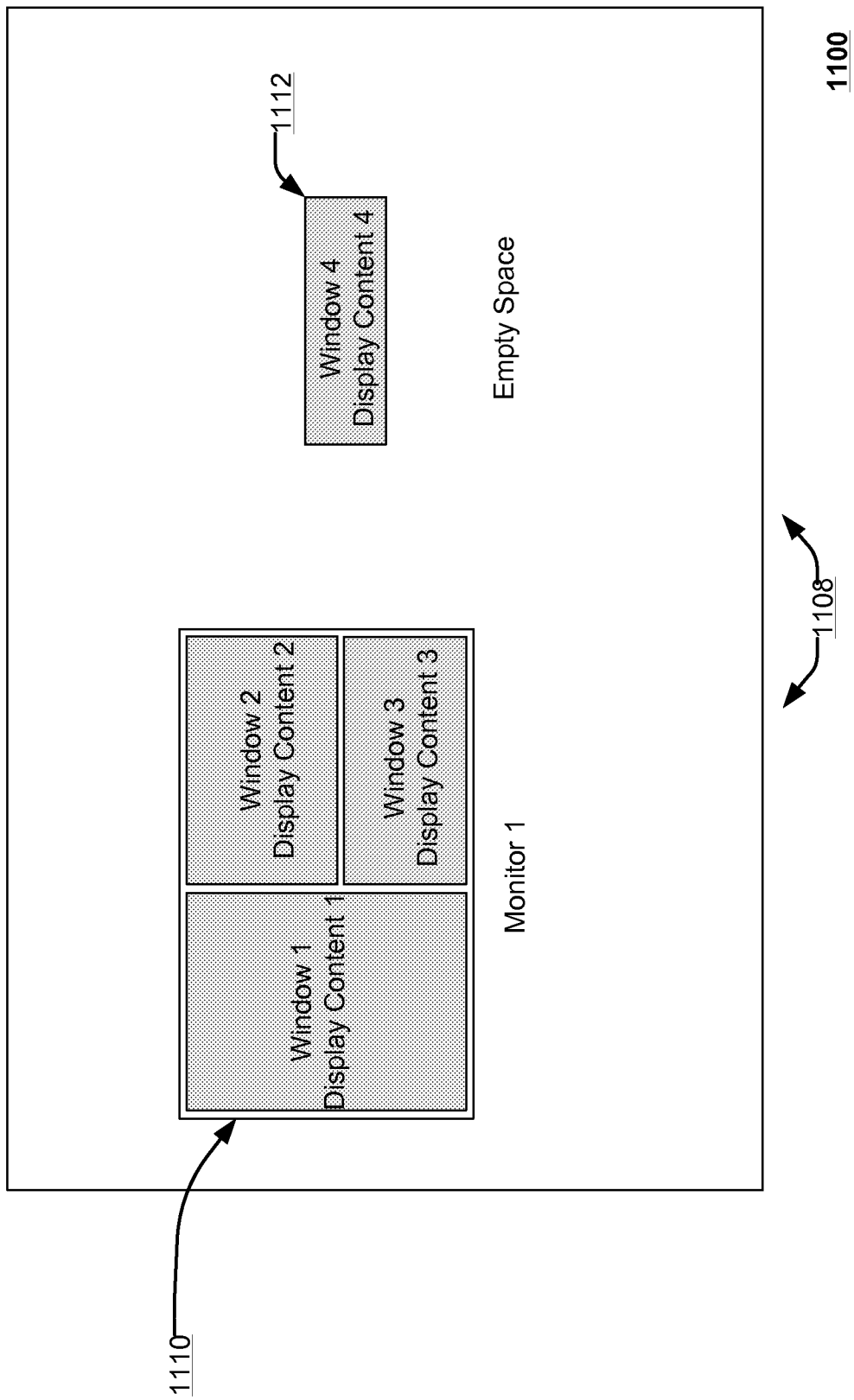
FIG. 11B is a presentation of how prior art are limited in their capacity to present the displaying of content (e.g., windows within computer applications, various GUIs of computer applications, dialog windows within computer applications, dialog windows related to operating systems, etc.) in systems with only single monitors installed when particular content have been shifted to a secondary monitor in a previous work session.

An example of the limitation of conventional systems and methods in managing user-manipulated (by cursor dragging) multiple monitor layout settings is presented in FIGS. 11A and 11B. In FIG. 11A, two monitors are shown at 1102, with an example of how displays of content can be set up by the user to display on those two monitors. At 1104, one can see three windows have been defaulted to display on Monitor 1. At 1106, one can see that one window has been defaulted to display on Monitor 2. This is an ideal representation of multiple monitor display management and is managed exceptionally by the conventional systems and methods. However, when the second monitor is uninstalled from the computer, the conventional systems and methods are limited in their ability to let the user access certain windows defaulted to open in the second monitor (e.g., Dialog screens and messages that are defaulted to open in the second monitor). In FIG. 11B, one can see the result of uninstalling the second monitor with these settings defaulted. While Windows 1, 2 and 3 display correctly in Monitor 1 shown at 1110, Window 4, which was defaulted to open in Monitor 2 in FIG. 11A, continues to display in the region apportioned for that monitoring, rendering it unreachable by the user working with just one monitor. The user is then required to install a second monitor and then physically drag Window 4 from Monitor 2 and into the space allotted for Monitor 1 to be able to effectively access and use information on that window.

Figure 12:
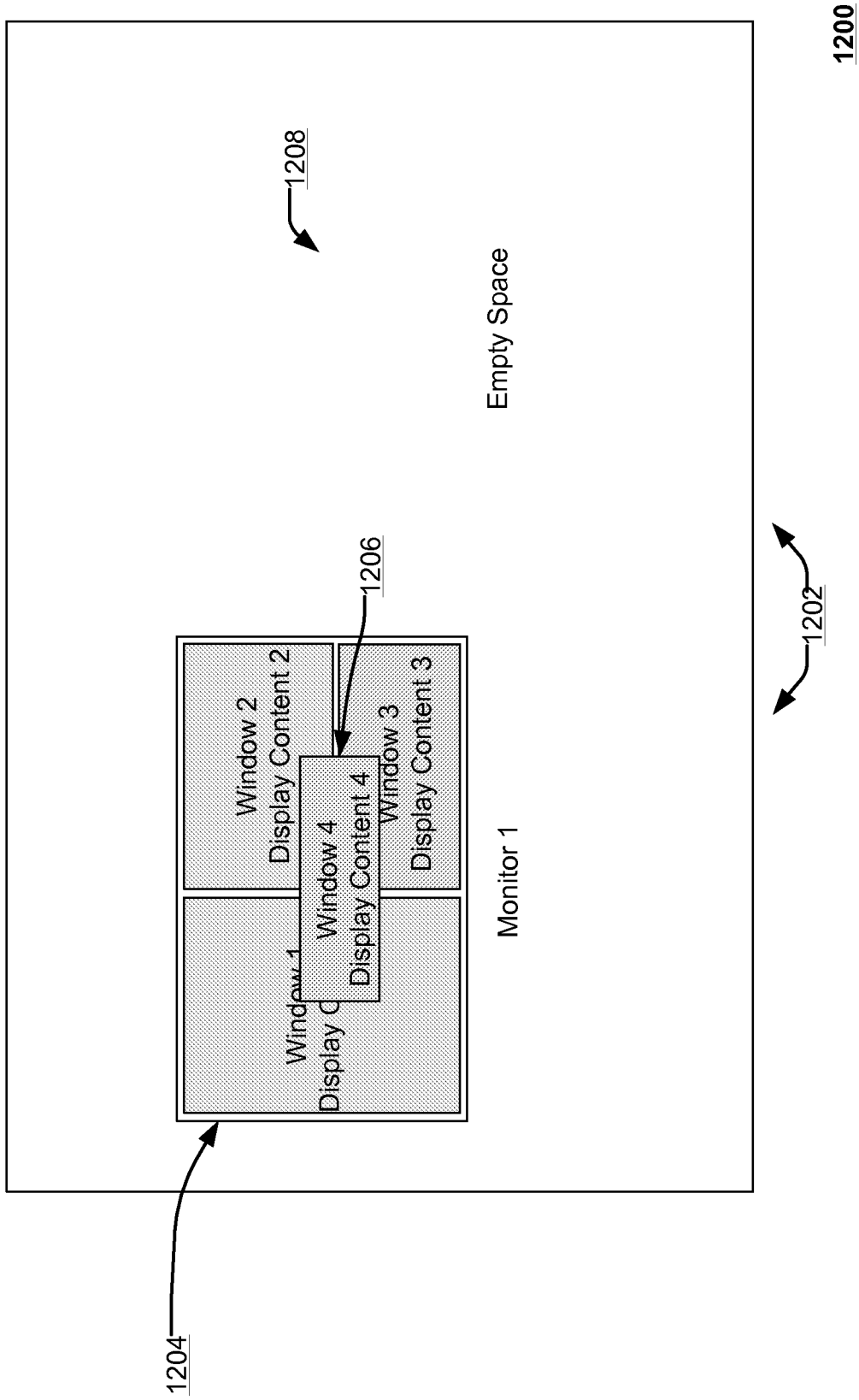
FIG. 12 is a presentation of how the exemplary system and method would display the same display layout as described in FIGS. 11A and 11B.

FIG. 12 is used to illustrate the way in which the system and method address the issue presented in FIGS. 11A and 11B. The system and method as shown at 1202 is able to detect the lack of presence of a second monitor at system start-up or at the uninstallation point of the second monitor. Window 4 shown at 1206, which was defined by the user (when two monitors were present) to default to open in the space allotted for the second monitor 1208, instead opens within the space allotted for the first monitor 1202, using the default settings of the computer application as its guide for location for that window. Advantageously, this enables users to manage their various windows within and across monitors without concern for the ways in which the user experience will change when a second monitor is uninstalled from the computer.

The above-described devices and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. In embodiments in which a computer system is connected to a network, it may communicate with other network connected devices using any suitable protocol and can be implemented using one or more programmed computer systems or devices.

To implement such variations as well as other variations, a single computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments may store the information used to implement the exemplary embodiments of the present inventions. The databases can be organized using data structures (e.g., records, tables, arrays, fields, graphs, trees, lists, and the like) included in one or more memories or storage devices, such as those listed herein. The processes described with respect to the exemplary embodiments may include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the invention, as will be appreciated by those skilled in the computer and software arts. Appropriate software can be readily prepared by programmers of ordinary skill based on the teachings of the invention, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, embodiments of the invention are not limited to any specific combination of hardware circuitry and/or software.

Stored on any one or on a combination of computer readable media, exemplary embodiments of the invention may include software for controlling the devices and subsystems of the exemplary embodiments, for driving the devices and subsystems of the exemplary embodiments, for enabling the devices and subsystems of the exemplary embodiments to interact with a human user, and the like. Such software may include, but is not limited to, device drivers, firmware, operating systems, development tools, applications software, and the like. Such computer readable media may include the computer program product of an embodiment of the invention for performing all or a portion (if processing is distributed) of the processing performed in implementing the invention. Computer code devices of exemplary embodiments of the invention may include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the invention can be distributed for better performance, reliability, cost, and the like.

As stated above, the devices and subsystems of exemplary embodiments may include computer readable medium or memories for holding instructions programmed according to the teachings of the invention and for holding data structures, tables, records, and/or other data described herein. Computer readable medium may include any suitable medium that participates in providing instructions to a processor for execution. Such a medium can take many forms, for example, non-volatile media, volatile media, transmission media, and the like. Non-volatile media can include, for example, optical or magnetic disks, magneto-optical disks, and the like. Volatile media can include dynamic memories, such as random access memory (RAM) and the like. Transmission media may include, for example, coaxial cables, copper wire, fiber optics, air and the like. Transmission media also may take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, Programmable Read-Only Memory PROM, Erasable Programmable Read-Only Memory (EPROM), Electrically Erasable Programmable Read-Only Memory (EEPROM or Flash memory) EEPROM (e.g., a FLASH-EPROM), any other suitable memory chip or cartridge, or any other suitable medium from which a computer can read.

Thus, the present invention includes recognition that currently existing multiple monitor management applications, although enabling users to drag and resize displays of content within and across monitors, are not able to provide users with default layout settings for multiple displays of content within and across multiple monitors, or to give users the ability to create and save customized layout settings within and across multiple monitors. Advantageously, the exemplary embodiments of the invention identify the presence of multiple monitors (or lack of that presence) and provide users a range of tools to manage displays of content within and across those multiple monitors, from within the invention's GUI, from within operating systems and from within computer applications.

While the present inventions have been described in connection with a number of exemplary embodiments, and implementations, the present inventions are not so limited, but rather cover various modifications, and equivalent arrangements, which fall within the purview of the appended claims.

What is claimed is:

1. A computer-implemented method for configuring a multiple monitor layout in a computer system, the method comprising:
   detecting, by a processor, a number of monitors installed on the computer system;
   providing, based on the detected number of monitors, a graphical user interface that enables a user to configure one or more monitor layouts for displaying a plurality of application windows on the monitors, each monitor layout reflecting a configuration of how at least one application window is displayed on each of the monitors installed on the computer system;
   displaying a plurality of previously configured monitor layouts via the graphical user interface based on the detected number of monitors;
   receiving a selection of a first one of the displayed previously configured monitor layouts via the graphical user interface; and
   displaying the plurality of application windows on at least one monitor according to the selected first previously configured monitor layout.

2. The computer-implemented method of claim 1, wherein the first previously configured monitor layout was previously configured by an end user of the computer system.

3. The computer-implemented method of claim 1, further comprising:
   receiving, via the graphical user interface, an input designating at least one user-defined characteristic of how to display content on at least one of the monitors;
   configuring a user-defined monitor layout based on the user-defined characteristic; and
   saving the user-defined monitor layout in a memory.

4. The computer-implemented method of claim 3, further comprising:
   displaying content on at least one of the monitors according to the user-defined monitor layout.

5. The computer-implemented method of claim 3, wherein the at least one user-defined characteristic includes at least one of a size, a shape, and a location of a first application window on a first monitor installed on the computer system.

6. The computer-implemented method of claim 5, the method further comprising:
   receiving, via the graphical user interface, a selection of a first application for generating content displayed in the first application window.

7. The computer-implemented method of claim 5, wherein the at least one user-defined characteristic includes at least one of a size, a shape, and a location of a second application window displayed on a second monitor installed on the computer system.

8. The computer-implemented method of claim 1, herein the detected number of monitors installed on the computer system is one, the method further comprising:
   determining that the selected first previously configured monitor layout includes a configuration for displaying a first application window on a first monitor and a second application window on a second monitor; and
   displaying the second application window on the first monitor based on detecting that the number of monitors installed on the computer system equals one.

9. The computer-implemented method of claim 1, wherein the detected number of monitors installed on the computer system is two, the method further comprising:
   providing, by the processor, a set of monitor layout options for two monitors via the graphical user interface, each set of monitor layout options reflecting how the plurality of application windows are displayed on a first monitor and a second monitor of the computer system;
   configuring the monitor layout based on a selection of one of the monitor layout options via the graphical user interface; and
   displaying the plurality of application windows based on the selected monitor layout.

10. The computer-implemented method of claim 1, wherein the detecting the number of monitors installed on the computer system is performed in response to determining that an application for displaying content on the computer system has been opened.

11. A computer system for configuring a multiple monitor layout, the system comprising:
 a memory storing instructions; and
 a processor configured to execute the instructions to:
  detect a number of monitors installed on the computer system;
  provide, based on the detected number of monitors, a graphical user interface that enables a user to configure one or more monitor layouts for displaying a plurality of application windows on the monitors, each monitor layout reflecting a configuration of how at least one application window is displayed on each of the monitors installed on the computer system;
  display a plurality of previously configured monitor layouts via the graphical user interface based on the detected number of monitors;
  receive a selection of a first one of the displayed previously configured monitor layouts via the graphical user interface; and
  display the plurality of application windows according to the selected first previously configured monitor layout.

12. The system of claim 11, wherein the first previously configured monitor layout was previously configured by an end user of the computer system.

13. The system of claim 11, the processor is further configured to:
 receive, via the graphical user interface, an input designating at least one user-defined characteristic of how to display content on at least one of the monitors;
 configure a user-defined monitor layout based on the at least one user-defined characteristic; and
 save the user-defined monitor layout in a memory.

14. The system of claim 13, the processor is further configured to:
 display content according to the user-defined monitor layout.

15. The system of claim 13, wherein the at least one user-defined characteristic includes at least one of a size, a shape, and a location of a first application window on a first monitor installed on the computer system.

16. The system of claim 15, the processor is further configured to:
 receive, via the graphical user interface, a selection of a first application for generating content displayed in the first application window.

17. The system of claim 15, wherein the at least one user-defined characteristic includes at least one of a size, a shape, and a location of a second application window displayed on a second monitor installed on the computer system.

18. The system of claim 11, wherein the processor is further configured to:
 provide a set of monitor layout options for displaying the plurality of application windows on the first and second monitor;
 receive a selection of one of the monitor layout options;
 configure the monitor layout of the computer system in accordance with the selected via the graphical user interface; and
 display the plurality of application windows based on the configured monitor layout, the plurality of application windows including a first application window generated by a first application running on the computer system and a second application window generated by the first application or a second application running on the computer system that is different from the first application.

19. The system of claim 11, wherein the processor is further configured to:
 detect the number of monitors installed on the computer system in response to determining that an application for displaying content on the computer system has been opened.

20. A computer-readable medium storing one or more computer readable instructions configured to cause one or more processors to:
 detect a number of monitors installed on the computer system;
 provide, based on the detected number of monitors, a graphical user interface that enables a user to configure one or more monitor layouts for displaying a plurality of application windows on the monitors, each monitor layout reflecting a configuration of how at least one application window is displayed on each of the monitors installed on the computer system;
 display a plurality of previously configured monitor layouts via the graphical user interface based on the detected number of monitors;
 receive a selection of a first one of the displayed previously configured monitor layouts via the graphical user interface; and
 display the plurality of application windows according to the selected first previously configured monitor layout.

21. The computer-readable medium of claim 20, the computer readable instructions further configured to cause the one or more processors to:
 receive, via the graphical user interface, an input designating at least one user-defined characteristic of how to display content on at least one of the monitors;
 configure a user-defined monitor layout based on the user-defined characteristic; and
 save the user-defined monitor layout in a memory.

22. A device for configuring a multiple monitor layout, comprising:
 a memory storing instructions; and
 a processor configured to execute the stored instructions to:
  detect a number of monitors installed on a computer system;
  provide, based on the detected number of monitors, a graphical user interface that enables a user to configure one or more monitor layouts for displaying a plurality of application windows on the monitors, each monitor layout reflecting a configuration of how at least one application window is displayed on each of the monitors installed on the computer system;
  provide information reflecting a plurality of previously configured monitor layouts via the graphical user interface based on the detected number of monitors;
  receive a selection of a first one of the displayed previously configured monitor layouts via the graphical user interface; and
  direct the plurality of application windows to be displayed according to the selected first previously configured monitor layout.

* * * * *

UNITED STATES PATENT AND TRADEMARK OFFICE
CERTIFICATE OF CORRECTION

PATENT NO. : 8,471,781 B2
APPLICATION NO. : 12/406090
DATED : June 25, 2013
INVENTOR(S) : Deepak Massand Page 1 of 1

It is certified that error appears in the above-identified patent and that said Letters Patent is hereby corrected as shown below:

In the Claims

In claim 8, col. 10, line 43, "herein" should read --wherein--.

Signed and Sealed this
Twentieth Day of August, 2013

Teresa Stanek Rea
*Acting Director of the United States Patent and Trademark Office*